United States Patent [19]

Iwata et al.

[11] 4,016,574
[45] Apr. 5, 1977

[54] PROGRAM-CONTROLLED SHUTTER

[75] Inventors: Hiroshi Iwata, Osaka; Katsuji Ishikawa, Daito, both of Japan

[73] Assignee: West Electric Company, Ltd., Japan

[22] Filed: Apr. 17, 1975

[21] Appl. No.: 569,006

[30] Foreign Application Priority Data

Apr. 23, 1974 Japan .................... 49-46280

[52] U.S. Cl. .................. 354/29; 354/23 D; 354/44
[51] Int. Cl.² ........................... G03B 7/14
[58] Field of Search ........... 354/23 D, 26, 29, 30, 354/44, 234, 60 A; 352/141

[56] References Cited

UNITED STATES PATENTS

| | | | |
|---|---|---|---|
| 3,744,385 | 7/1973 | Burgarella et al. | 354/23 D |
| 3,813,680 | 5/1974 | Wagensonner et al. | 354/23 D |
| 3,882,522 | 5/1975 | Erlichman | 354/44 X |
| 3,900,855 | 8/1975 | Stempeck | 354/23 D |

*Primary Examiner*—L. T. Hix
*Assistant Examiner*—J. A. LaBarre
*Attorney, Agent, or Firm*—Burgess Ryan and Wayne

[57] ABSTRACT

The invention discloses a program-controlled shutter wherein, depending upon the brightness of a subject, a suitable f-number and a suitable exposure time are determined by a plurality of shutter blades which are driven stepwise by a stepping motor in response to driving pulses applied thereto open the camera lens to a suitable f-number and then to close it after a suitable exposure time. To derive the electrical signal representative of the brightness of a subject, a photocell, an A-D converter, an encoder for encoding the output from a A-D converter into the binary-coded decimal signal, and a decoder for converting the output from the encoder into, for instance, a sexadecimal signal are used. In order to derive the opening pulse signal in response to which the shutter blades are opened to stop down the camera lens to a suitable f-number, a circuit for generating the voltage signal representative of the output signal from the decoder and a circuit for generating the opening pulse signal consisting of one or a plurality of pulses the number of which is dependent upon the voltage signal are used. In order to determine a suitable exposure time, an integrator in which the time when the voltage charged across a capacitor reaches a predetermined level is dependent upon the output from the decoder and a circuit which generates, in response to the output from the integrator, a closing pulse signal for reversing the stepping motor so as to close the shutter blades after a suitable exposure time which is a function of the f-number set for a given light or exposure value EV are used.

19 Claims, 6 Drawing Figures

PROGRAM-CONTROLLED SHUTTER

BACKGROUND OF THE INVENTION

The present invention relates to a program-controlled shutter of the type in which an exposure control mechanism comprises a plurality of shutter blades which also serve as the aperture blades and driving means such as a stepping motor for driving the shutter blades. The opening pulse signal to be applied to the driving means for opening the shutter blades so as to stop down the camera lens to a suitable aperture or f-number depending upon the brightness of a subject or light or exposure value VE as well as the closing pulse signal to be applied also to the driving means for closing the shutter blades a suitable exposure time, which is a function of the f-number set for the given exposure value, are generated in response to a digital signal representative of the brightness of the subject.

There have been devised and demonstrated various types of the program-controlled shutters. In one type of the program-control shutters called the triangle opening type, the shutter blades which also function as the aperture blades, are continuously being opened from the completely closed position to the wide opened position, and when a predetermined time is elapsed, the shutter blades are rapidly closed even when they are being still opened toward the wide opened position. In the program-controlled shutters of the type described, the tension spring is generally used to store the energy when the film is advanced, so that the energy may be liberated to open and then return the shutter blades to their initial closed position. In this case, in general, a governor mechanism is used to retard the returning speed of the shutter blades so as to change the shutter speed or exposure time, thereby controlling the exposure over a wide range. As a result, the conventional program-controlled shutters are very complex in construction.

Furthermore, the shutter blade driving force stored in and released from the spring is, in general, not uniform, so that the exposure characteristic or light-flux vs. time characteristic of the shutter changes from time to time. This inherently undesirable feature is much pronounced when the parts of the mechanical shutter are worn out, and the abrasion and wear of the mechanical parts adversely affect the service life of the shutter.

In another type of the program-controlled shutter, the shutter blades are opened until they are stopped by aperture control means whose position in turn, is controlled by a galvanometer in an exposure meter, and the shutter blades remain opened for a desired time. However, the shutter blades are opened only after the aperture control means has been displaced to and securely held in a controlled position in response to the movement of the scanner means which is arrested by the meter needle of the galvanometer. As a consequence, there is some time lag between the time when the brightness of a subject is detected and the time when the shutter blades are actuated because of the time required for the scanner means to engage with the meter needle and the time required for the aperture control means to be displaced to and held in a predetermined control position, so that the shutter operation cannot sufficiently respond to relatively rapid changes in brightness of a subject. Furthermore, the program-controlled shutters of the type described have further undesirable features in that the galvanometer is extremely susceptible to damage due to mechanical shocks and that the construction is very complex.

SUMMARY OF THE INVENTION

One of the objects of the present invention is therefore to provide a program-controlled shutter which is restricted to the minimum number of mechanical parts so that the time lag due to the mechanical parts and the adverse affect on the service life of the shutter due to the abrasion and wear of the mechanical parts may be minimized.

Another object of the present invention is to provide a program-controlled shutter in which the non-uniform exposure characteristic or light-flux vs. time characteristic caused by the production variation of mechanical parts and the abrasion and wear thereof may be prevented.

A further object of the present invention is to provide a program-controlled shutter whose operation is controlled electrically so that a camera compact in size and light in weight may be provided.

To the above and other ends, according to the present invention, the only mechanical mechanism is an exposure control mechanism comprising a plurality of shutter blades which also function as the aperture blades and driving means such as a stepping motor for opening and closing the shutter blades stepwise. The control of such aperture control mechanism is all carried out electronically. The shutter blades are opened stepwise to stop the camera lens to a suitable aperture or f-number depending upon the number of pulses applied to the driving means, which number is, in turn, dependent upon the brightness of a subject. A digital signal representative of the brightness of a subject is generated by a photocell, an A-D converter, an encoder for encoding the output from the A-D converter into a binary coded signal and an decoder for encoding the output from the encoder into, for instance, the sexadecimal signal. The opening pulse signal to be applied to the driving means of the exposure control mechanism is generated by a circuit for generating a voltage signal in response to the output from the decoder and a circuit such as a differential amplifier for generating opening pulses the number of which is dependent upon the voltage signal. The closing pulse signal to be applied to the driving means for closing the shutter blades after a desired exposure time is generated by an integrator, in which the time when the voltage charge across a common capacitor reaches a predetermined level is dependent upon the output from the decoder and a circuit such as a comparator for permitting the transmission of the closing pulses to the driving means when the voltage across the common capacitor in the integrator, reaches a predetermined level.

Figure 1A:
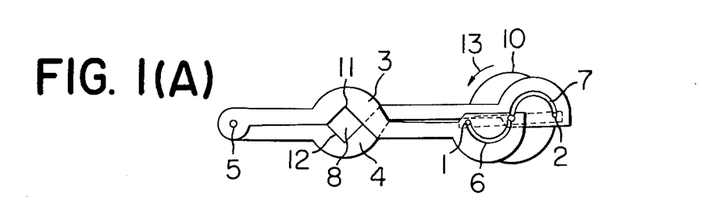
FIGS. 1A and 1B show an exposure control mechanism used in the present invention.
Figure 1B:
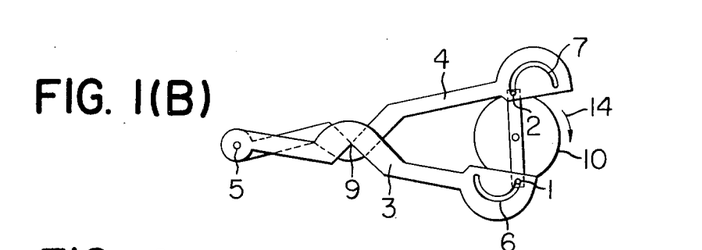

DESCRIPTION OF THE PREFERRED EMBODIMENT:

FIGS. 1A and 1B show an exposure control mechanism of a program-controlled shutter in accordance with the present invention, the mechanism comprising a stepping motor 10 and two shutter blades 3 and 4, which also function as the aperture blades and each have one end pivoted to each other with a pivot pin 5. The other end of each shutter blade 3 or 4 terminates in a semicircular sector provided with an arcuate guide slot 6 or 7 into which is slidably fitted a driving pin 1 or 2 of the stepping motor 10. The shutter blades 3 and 4 are further provided with aperture defining portions 11 and 12, respectively.

When the stepping motor 10 is rotated in the direction indicated by the arrow in FIG. 1A, the driving pins 1 and 2 are moved along the arcuate guide slots 6 and 7, respectively, so that the wide opened aperture 8 defined by the aperture defining portions 11 and 12 is closed stepwise and then completely closed as shown at 9 in FIG. 1B. When the stepping motor 10 is rotated from the shutter closed position in the direction indicated by the arrow in FIG. 1B, the shutter blades 3 and 4 are opened stepwise to define the aperture or to stop down the camera lens. The opening area of the aperture 8 at each stop may be suitably selected by selecting the radius curvature of the guide slots 6 and 7.

Figure 2:
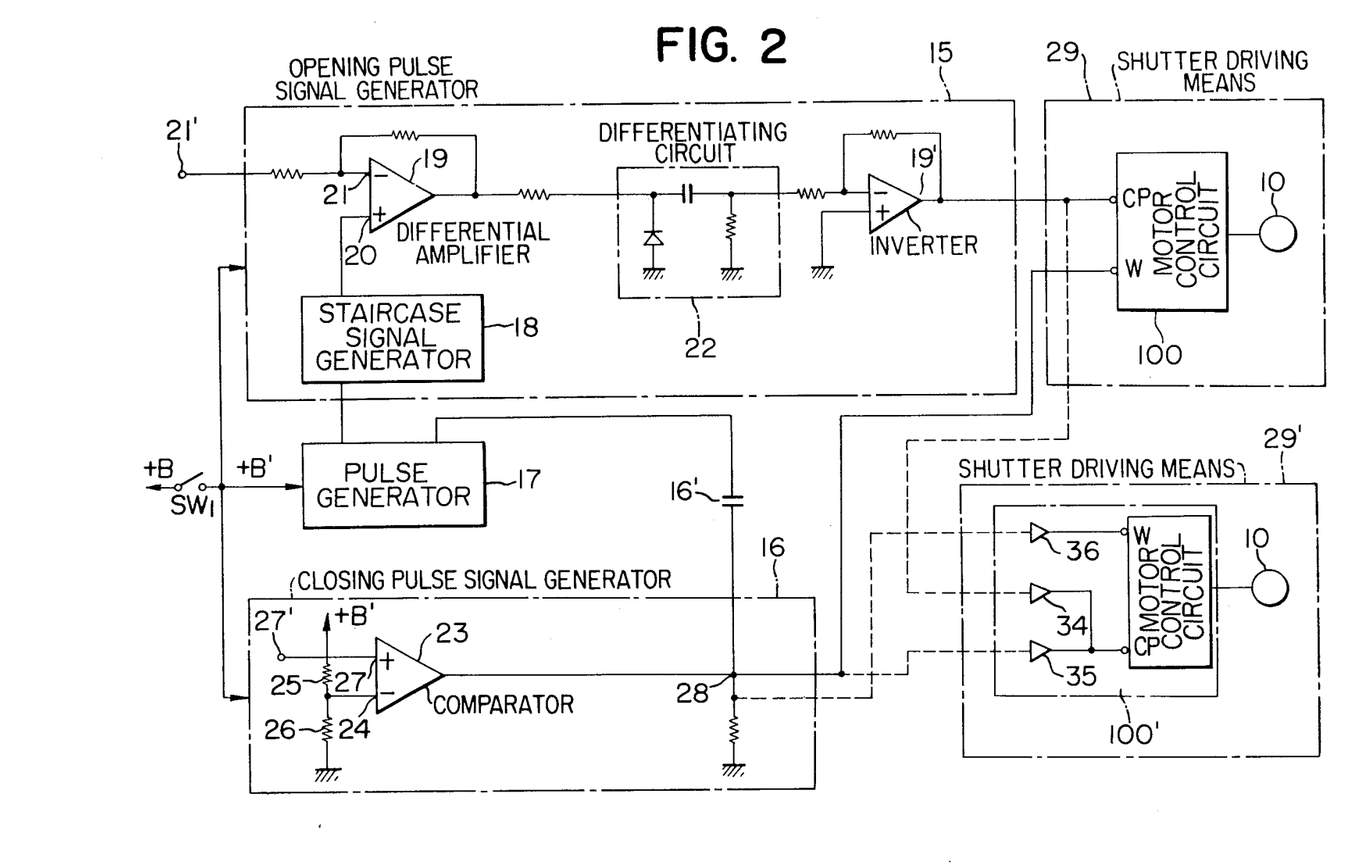
FIG. 2 is a diagram of a fundamental control circuit for controlling the exposure control mechanism shown in FIGS. 1A and 1B.

FIG. 2 is a block diagram of the fundamental control circuit for controlling the operation of the stepping motor 10 shown as being enclosed within the block 29 or 29'. The control circuit comprises, in general, an opening pulse signal generator generally indicated by the referece numeral 15 and a closing pulse signal generator generally indicated by the reference numeral 16.

Figure 3:
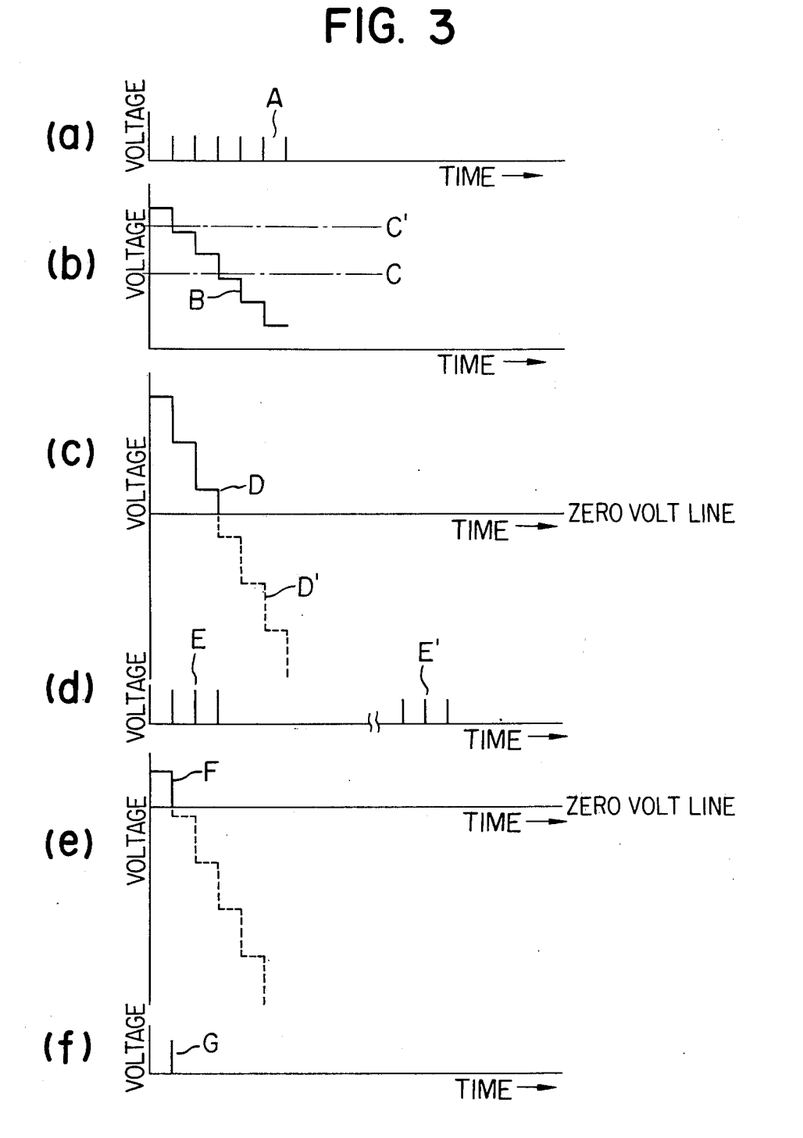
FIG. 3 is a diagram used for the explanation thereof.

When a switch $SW_l$ is closed, a pulse generator 17 is connected to a power supply +B and is actuated to generate the pulses A shown at (a) in FIG. 3. In response to these pulses, a staircase signal generator 18 generates a staircase signal B shown at (b) in FIG. 3, and the staircase signal B is applied to one input terminal 20 of a differential amplifier 19. A voltage signal with a predetermined level C or C' as shown at (b) in FIG. 3 is applied to the other input terminal of the differential amplifier 19 from an input terminal 21'. Then from the output terminal of the differential amplifier 19 is derived an output signal consisting of a positive staircase signal above the 0-volt line indicated by the solid lines D at (c) in FIG. 3 and a negative staircase signal indicated by the broken lines D' at (c) in FIG. 3 below the 0-volt line. Only the positive staircase signal D is converted by a differentiating circuit 22 and an inverter 19' into the pulses E as shown in FIG. 3 (d). More particularly, when a voltage signal with the level C is applied to the input terminal 21 of the differential amplifier 19, three pulses E are derived from the output terminal of the inverter 19', but when the voltage signal with the level C' is applied, only one pulse F (See FIG. 3-(e) is derived. That is, depending upon the level of the voltage signal applied to the input terminal 21 of the differential amplifier 19, the number of pulses of the opening pulse signal changes.

When the opening pulse signal is applied to the stepping motor 10, the shutter blades 3 and 4 are opened in steps equal in number to the pulses of the opening pulse signal. In other words, the opening area of the aperture defined by the shutter blades 3 and 4 is dependent upon the number of pulses applied to the stepping motor 10. In the instant embodiment, it is assumed that in response to the number X of the pulses applied to the stepping motor 10, the shutter blades 3 and 4 stop down the camera lens to the following $f$-number:

| Number of pulses X | f-number |
|---|---|
| 1 | 16 |
| 2 | 11 |
| 3 | 8 |
| 4 | 5.6 |
| 5 | 4.0 |

For the present example, therefore, the shutter blades 3 and 4 stop down the camera lens to $f$-8 when an opening pulse signal E consisting of three pulses is applied to the stepping motor. In like manner, they stop down the camera lens to $f$-16 when an opening pulse signal G consisting of only one pulse is applied.

In the closing pulse signal generator 16, an input voltage which is dependent upon the ratio of the values of resistors 25 and 26, making up a voltage divider is impressed on one input terminal 24 of a comparator 23. When the level of the input signal applied to the other input terminal of the comparator 27 exceeds the level of the input signal applied to the input terminal 24, the output from the comparator 27 changes to high level. When the output from the comparator 23 is at low level, the terminal W of the motor control circuit 100 is short-circuited. Now in response to the high level output signal from the comparator 23, the terminal W is opened, so that the pulses from the pulse generator 17 are transmitted through a capacitor 16' to an output terminal 28 as the closing pulse signal E' as shown at (d) in FIG. 3.

Figure 4:
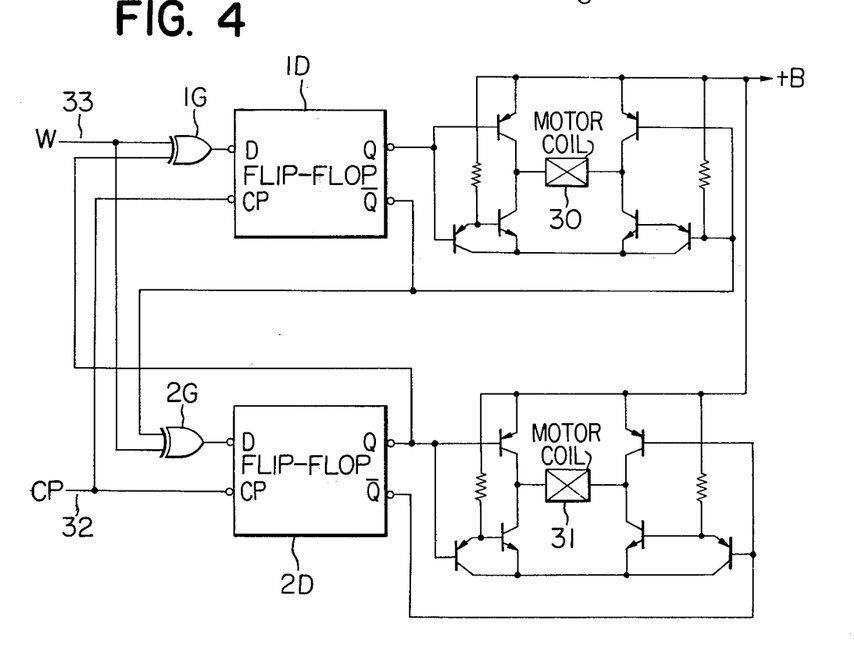
FIG. 4 is a diagram of a motor control circuit for reversing the stepping motor shown in FIGS. 1A and 1B in response to the pulse signals applied thereto.

Since the closing pulse signal E' consists of positive pulses as in the case of the opening pulse signal, a motor control circuit 100' must be used so that the stepping motor 10 may reverse in response to the positive pulses of the closing pulse signal E'. In the motor control circuit 100', a stepping motor 10 of the type in which the direction of current flow through two-phase motor coils 30 and 31 may be reversed is used as shown in FIG. 4. The motor control circuit 100' comprises, in general, D flip-flops 1D and 2D., gate circuits 1G and 2G for controlling the D flip-flops 1D and 2D, respectively, and transistor bridge circuits. The output terminals Q and Q of the D flip-flops 1D and 2D are connected to the terminals of the motor coils 30 and 31, respectively, through the transistor bridge circuits or current reversal circuits. In response to the pulse signal applied to the CP terminal 32 which is connected to the CP terminals of the D flip-flops 1D and 2D and in response to the signal representative of the direction of rotation of the stepping motor 10 and applied to the W terminal 33 which is connected to the gate circuits 1G and 2G to the D terminals of the flip-flops 1D and 2D, the latter are controlled so as to control the direction of the current flowing through each motor coil 30 or 31, whereby the direction of rotation of the stepping motor 10 is determined.

Referring back to FIG. 2, the opening or closing pulse signal E or E' consisting of one or a plurality of pulses is applied through a buffer amplifier 34 or 35 to the CP terminal corresponding to the terminal 32 in FIG. 4 and the signal representative of the direction of rotation of the stepping motor 10 is applied from the output terminal 28 of the closing pulse signal generator 16 through a buffer amplifier 36 to the W terminal corresponding to the terminal 33 in FIG. 4. Therefore only when the output signal from the closing pulse signal generator 16 changes to high level, is the stepping motor 10 reversed in direction so that the shutter blades 3 and 4 are closed.

When the shutter blades 3 and 4 are closed, the switch $SW_1$ is opened to interrupt the connection between the power supply +B and the pulse generator 17, the opening pulse signal generator 15 and the closing pulse signal generator, and a reset signal is applied to the motor control circuit 100' so that the shutter blades 3 and 4 may be securely held in closed position.

Figures 5, 5B:
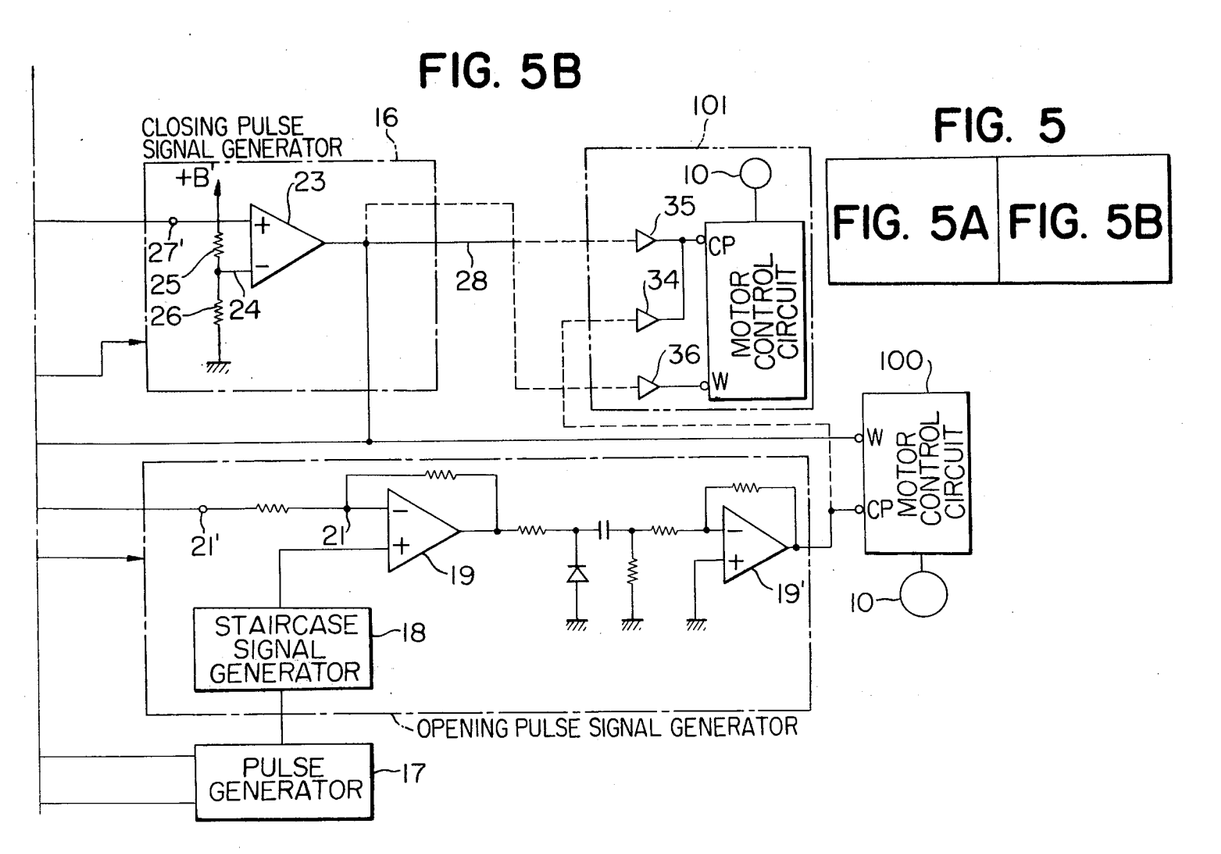
FIG. 5 is a diagram of one preferred embodiment of a program-controlled shutter circuit.
Figure 5A:
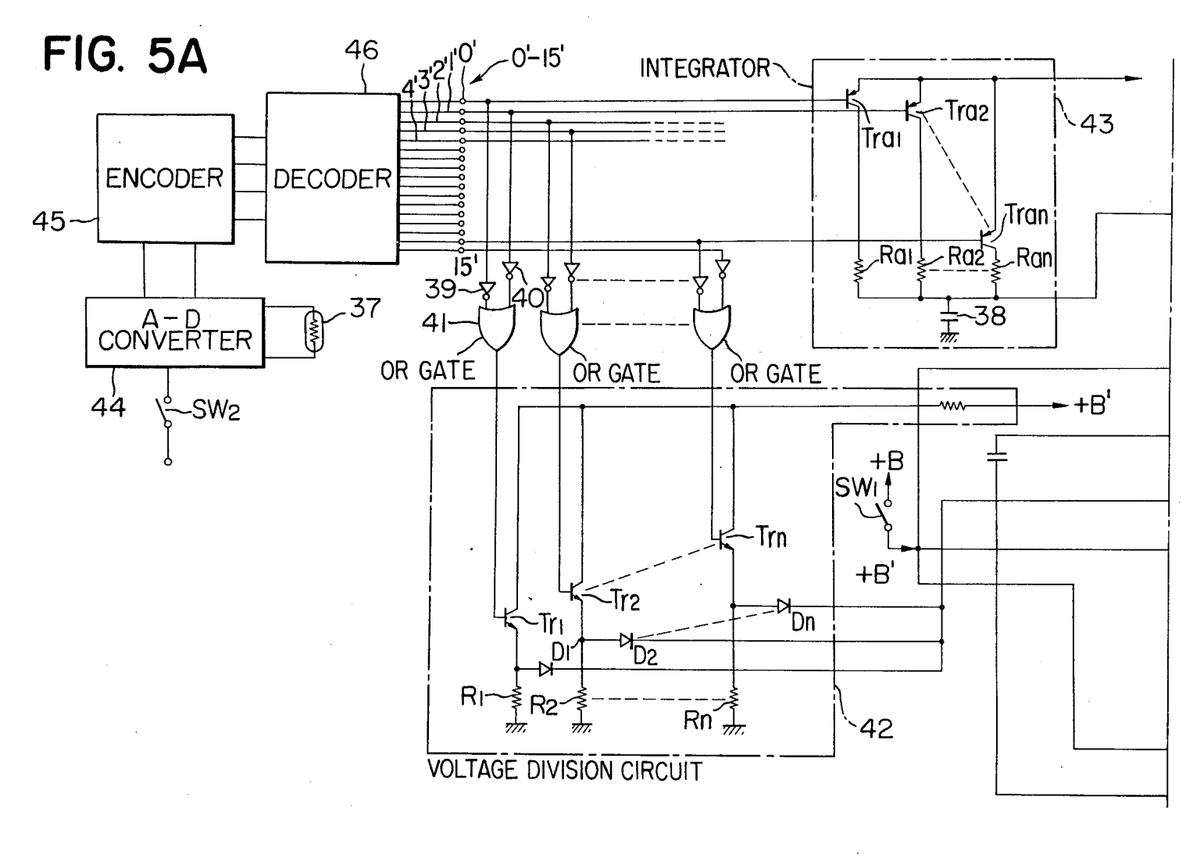

Next referring to FIG. 5, to the other input terminal 21 of the differential amplifier 19; that is, to the input terminal 21' of the opening pulse signal generator 15 is applied the output signal from a voltage division circuit generally indicated by 42, in response to the level of the output signal from the circuit 42 the shutter blades 3 and 4 stopping down the camera lens to a suitable $f$-number in the manner described above depending upon the brightness of a subject. To the input terminal 27' of the closing pulse signal generator 16 is applied the output signal from an integrator generally indicated by the reference numeral 43. In response to the level of this output signal, a suitable exposure time is determined as a function of the $f$-number set and depending upon the brightness of a subject.

The voltage division circuit 42 which determines the level of the signal applied to the input terminal 21' of the opening pulse signal generator 15 comprises, in general, the combination of a plurality of transistors $Tr$-1 to $Tr$-n, a plurality of diodes $D_1$ to $D_n$, and a plurality of resistors $R_1$ to $R_n$. As will be described in detail hereinafter, one of the transistors $Tr$ conducts depending upon the brightness of a subject, so that the output signal with a suitable level is applied to the input terminal 21' of the opening pulse signal generator 15.

The integrator 43 which determines the level of the signal to be applied to the input terminal 27' of the closing pulse signal generator 16 comprises, in general, the combination of a plurality of transistor $Tr_{a1}$ to $Tr_{an}$, a plurality of resistors $R_{a1}$ to $R_{an}$, and a capacitor 38. Depending upon the $f$-number selected and the brightness of a subject, one of the transistors $Tr_a$ conducts so that the output signal with a suitable level will be applied to the input terminal 27' of the closing pulse signal generator 16 as will be described in detail hereinafter, whereby a suitable exposure time may be set.

In the program-controlled shutters, various combinations of the aperture or f-number and the shutter speed may be used for a given light or exposure value EV. In the instant embodiment, the program as shown in Table 1 is used when the film speed is ASA 100.

TABLE 1:

| EV | f-number | exposure time in sec. |
| --- | --- | --- |
| 17 | 16 | 1/500 |
| 16 | 16 | 1/250 |
| 15 | 11 | 1/250 |
| 14 | 11 | 1/125 |
| 13 | 8.0 | 1/125 |
| 12 | 8.0 | 1/60 |
| 11 | 5.6 | 1/60 |
| 10 | 5.6 | 1/30 |
| 9 | 4.0 | 1/30 |
| 8 | 4.0 | 1/15 |

TABLE 1:-continued

| EV | f-number | exposure time in sec. |
| --- | --- | --- |
| 7 | 4.0 | 1/8 |
| 6 | 4.0 | 1/4 |
| 5 | 4.0 | 1/2 |
| 4 | 4.0 | 1 |
| 3 | 4.0 | 2 |
| 2 | 4.0 | 4 |

The operation of the program-controlled shutter in accordance with the present invention is started when the switches $SW_1$ and $SW_2$ operatively coupled to a shutter release button (not shown) are closed. When the switch $SW_1$ is closed, the power is supplied from the power supply +B, but when both the switches $SW_1$ and $SW_2$ are closed, the power is supplied from a power supply +B'. The brightness of a subject is measured by a photocell 37, and its analog output is converted by an A-D converter 44 into the digital signal. That is, when the exposure value is 17, one pulse is derived from the A-D converter 44. In like manner, two pulses are derived at EV-16; three pulses are derived at EV-15, and so on. Therefore, at EV-2, 16 pulses are derived. There are available various A-D converters capable of such A-D conversion. For instance, the output of the photocell 37 is integrated to generate the time-base signal, and the pulses with a predetermined pulse spacing are transmitted during the time when this time-base signal lasts, whereby the number of pulses transmitted may be dependent upon the output from the photocell 37. The output pulses from the A-D converter 44 are applied to an encoder 45 of the conventional type for encoding the output pulses into the binary coded decimal number, and the output from the encoder 45 is applied to a decoder 46 so that the binary coded decminal number may be converted into the sexadecimal number. In other words, in reponse to the output signal from the encoder 45, the output signal of the decoder 46 appears at one of the 16 output terminals 0' to 15'. Thus is apparent that the outputs at the output terminals 0' to 15' represent the EVs shown in Table 1, respectively.

In summary, according to the present invention, from one of the 16 output terminals 0' to 15' of the decoder 46 is derived the output digital signal representative of one of the 16 EVs from $f$-16 to $f$-2 shown in Table 1 depending upon the brightness of a subject even though the brightness changes continuously from one subject to another. And in response to the output signal from the decoder 46, one of the transistors $Tr$ in the voltage division circuit 42 and one of the transistors $Tr_a$ in the integrator 43 conduct as will be described in detail hereinafter.

In the instant embodiment, one of the $f$-numbers from $f$-16 to $f$-4 is selected depending upon the brightness of a subject. Therefore, in the voltage division circuit 42, five series-connected circuits consisting of the transistor $Tr_1$ and the resistor $R_1$, the transistor $Tr_2$ and the resistor $R_2$, the transistor $Tr_3$ and the resistor $R_3$, the transistor $Tr_4$ and the resistor $R_4$ and the transistor $Tr_5$ and the resistor $R_5$, respectively, are connected in parallel to the power supply +B' so that the voltage across one of the five resistors $R_1$–$R_5$ represents the selected $f$-number $f$-16, $f$-11, $f$-8.0, $f$-5.6 or $f$-4.0. The values of the resistors $R_1$ to $R_5$ are of course different, so that the magnitude of the voltage across each resistor is different from those of the voltages across the other resistors. The output from the voltage division circuit thus obtained is applied to the input terminal 21' of the opening signal generator 15 and hence to the input terminal 21 of the differential amplifier 19 to one input terminal of which is applied the staircase signal from the staircase signal generator 16. Therefore the number of pulses of the opening pulse signal from the generator 15 changes depending upon the level of the output signal from the voltage division circuit 42; that is, depending upon the brightness of a subject as described hereinbefore. In response to the opening pulse signal from the generator 15, the shutter blades 3 and 4 stops down the camera lens to a suitable f-number in the manner described hereinabove.

As described above, according to the present invention, depending upon the number of pulses of the opening signal applied to the motor control circuit 100', the shutter blades 3 and 4 stops down the camera lens to a suitable f-number depending upon the brightness of a subject. Therefore, Table 1 may be rewritten as shown in Table 1 in which the f-number is given in terms of the number of pulses.

TABLE 2:

| Output from decoder 48 | Number of pulses of opening pulse signal | resistor |
| --- | --- | --- |
| 0 | 1 | $R_a$ |
| 1 | 1 | $R_b$ |
| 2 | 2 | $R_b$ |
| 3 | 2 | $R_c$ |
| 4 | 3 | $R_c$ |
| 5 | 3 | $R_d$ |
| 6 | 4 | $R_d$ |
| 7 | 4 | $R_e$ |
| 8 | 5 | $R_e$ |
| 9 | 6 | $R_f$ |
| 10 | 5 | $R_f$ |
| 11 | 6 | $R_g$ |
| 12 | 5 | $R_g$ |
| 13 | 5 | $R_h$ |
| 14 | 5 | $R_h$ |
| 15 | 5 | $R_i$ |

In the instant embodiment, depending upon the selected f-number, one of the 12 exposure times from 1/500 sec. to 4 sec. as shown in Table 1 is selected by the integrator 43. The integrator 43 consists of 12 integrator circuits each consisting of the transistor $Tr_{an}$, the resistor $R_{an}$ and the common capacitor 38, where $n = 1, 2, \ldots$ and 12. The values of the resistors $R_{an}$ are different so that the time when the voltage charge across the capacitor 38 reaches the level of the voltage signal applied to the input terminal 24 of the comparator 23 is different depending upon which of the transistor $Tr_a$ conducts; that is the brightness of a subject. In response to the output signal from the integrator 43, the closing pulse signal is generated by the generator 16 in the manner described hereinbefore and applied to the motor control circuit 100', so that the shutter blades 3 and 4 are closed after a suitable exposure time depending upon the brightness of a subject.

Since the exposure time changes depending upon the value of the resistor $R_{an}$, it may be expressed in terms of the resistor as shown in Table 2.

Next the mode of operation of the program-controlled shutter of the present invention will be described in more detail when the output signal is derived from the output terminal 0' of the decoder 46. The output signal is inverted by an inverter 39 and the output from the inverter 39 is transmitted through an OR gate 41 to the base of the transistor $Tr_1$ so that the latter conducts. As a result, the voltage across the resistor $R_1$ is impressed through the diode $D_1$ to the input terminal 21 of the differential amplifier 19, so that the opening pulse signal consisting of one pulse corresponding to EV-17 is applied to the motor control circuit 100'. In the integrator 43, the transistor $Tr_{a1}$ conducts in response to the output signal from the output terminal 0' of the decoder 46, so that the exposure time is now dependent upon the time constant which, in turn, depends upon the values of the resistor $R_{a1}$ and the common capacitor 38.

In case of EV 16, the low level output signal appears at the output terminal 1' of the decoder 46, and is inverted into the high level signal by an inverter 40. The output signal from the inverter 40 is transmitted through the OR gate 41 to the base of the transistor $Tr_1$ so that the latter conducts. Therefore, the shutter blades 3 and 4 stops down the camera lens to f-16 as with the case of EV-17. In the integrator 43, the transistor $Tr_{a2}$ is conducts in response to the output signal from the terminal 1' of the decoder 46, so that the exposure time is now dependent upon the time constant which in turn is dependent upon the values of the resistor $R_{a2}$ and the common capacitor 38.

In order that the same voltage divider consisting of the transistor $Tr_n$ and the resistor $R_n$ (where $n = 1, 2, \ldots,$ and 5) may be energized in response to various input signals applied to the associated OR gate, the number of the input terminals thereof may be selected depending upon the number of input signals applied thereto. For instance, the output terminals from 8' to 15' of the decoder 46 are connected to eight input terminals, respectively, of the OR gate connected to the base of the transistor $Tr_5$ of the voltage divider which causes the opening pulse signal generator 15 to generate the opening pulse signal consisting of five pulses as shown in Table 2.

In the integrator 43, in response to the output signal from the decoder 46, one of the 12 transistors $Tr_{an}$ is conducts, so that the exposure time is selected depending upon the time constant of the energized integrator circuit; that is, the values of the energized resistor $R_{an}$ (where $n = 1, 2, \ldots$ and 12) and the common capacitor 38 in a manner substantially similar to that described above.

As described hereinbefore, according to the present invention, the f-number and exposure time are selected depending upon the brightness of a subject in accordance with the programmed logic such as shown in Table 1. Therefore, the programmed logic may be modified in various manners as needs demand. For instance, the steps of the exposure time may be increased in number, so that the more optimum or correct exposure may be attained. Alternatively, the steps of the exposure time may be decreased in number, so that the number of EVs used may be decreased.

The program-controlled shutter with the construction described above may substantially overcome the problems encountered in the conventional program-controlled shutters and caused by the mechanical parts thereof.

Furthermore, the brightness detecting circuit consisting of the photocell 37 and the A-D converter 44 which is one of the novel features of the present invention makes it possible to detect the brightness of a subject without any delay, so that the shutter operation may immediately respond to the charge in brightness of a subject. Therefore, the time-delay problem encountered in the conventional program-controlled shutters of the type using a galvanometer may be substantially solved.

The shutter program; that is, the combinations of the f-numbers and exposure time for the given exposure value EV may be modified in various manners in accordance with the present invention, so that the present invention may offer the various exposure modes hitherto unattainable by the conventional program-controlled shutters.

What is claimed is:

1. A program-controlled shutter for a camera lens comprising
   a. an exposure control mechaism comprising a plurality of shutter blades having aperture defining portions, and driving means for stepwise opening and closing said shutter blades in response to the application thereto of opening and closing pulse signals;
   b. first means for generating an output signal continously representative of the brightness of a subject;
   c. opening pulse signal generating means for generating an opening pulse signal in response to said output signal from said first means and applying said opening pulse signal to said driving means, thereby opening said shutter blades so as to stop down the camera lens to a determined f-number depending upon the brightness of the subject;
   d. closing pulse signal generating means operating independently of said opening pulse signal generating means for generating said first means and applying said closing pulse signal to said driving means, thereby closing said shutter blades after a determined exposure time depending upon the brightness of the subject; and
   e. power supply means for supplying power to said exposure control mechanism, said opening and closing pulse signal generating means and said first means; whereby said exposure time depends upon the brightness of the subject.

2. A program-controlled shutter as set forth in claim 1 wherein said first means comprises
   photocell means for detecting the brightness of a subject; and
   converter means for converting the output from said photocell means into a digital signal representative of the brightness of the subject.

3. A program-controlled shutter as set forth in claim 2 wherein said converter means comprises
   a first converter for converting the analog output signal from said photocell means into said digital signal;
   a second converter for converting the output from said first converter into a binary coded decimal signal; and
   a third converter connected to said second converter and provided with a plurality of output terminals said third converter comprising means for generating, in response to binary coded decimal signal from said second converter, an output signal which appears selectively at one output terminal of said plurality of output terminals.

4. A program-controlled shutter as set forth in claim 1 wherein said opening pulse signal generating means comprises
   first switching means actuable in response to the output signal from said first means,
   voltage signal generating means for generating a first voltage signal when said switching circuit means is turned ON,
   a pulse generator for generating pulses with a predetermined pulse spacing, and
   means connected to said pulse generator and to said voltage signal generating means for generating said opening pulse signal in response to said first voltage signal and said pulses from said pulse generator.

5. A program-controlled shutter as set forth in claim 4 wherein said first switching means comprises
   a first bank consiting of a plurality of switches connected to said plurality of output terminals; and
   a second bank consisting of a plurality of switching circuit means connected to the corresponding switches in said first bank, whereby one of said switches in said first bank is turned on in response to the magnitude of said output signal from said first means so as to turn ON one of the switching circuit means associated thereto in said second bank.

6. A program-controlled shutter as set forth in claim 4 wherein said opening pulse signal generating means comprises
   a second voltage signal generator for generating a second voltage signal in response to said pulses from said pulse generator; and
   a circuit connected to said first voltage signal generating means and to said second voltage signal generator for generating a third voltage signal representative of the difference between said first and second voltage signals and for converting said third voltage signal into said opening pulse signal.

7. A program-controlled shutter as set forth in claim 1 wherein said closing pulse generating means comprises
   first switching means connected to said first means and actuable in response to the output therefrom;
   an integrator connected to said first switching means and actuable when said switching means is turned ON;
   a pulse generator for generating pulses with a predetermined pulse spacing; and
   means connected to said pulse generator and said integrator for generating said closing pulse signal in response to the output signal from said integrator and said pulses from said pulse generator.

8. A program-controlled shutter as set forth in claim 7 wherein said first switching means comprises
   a plurality of switching elements connected to said plurality output terminals of said first means such that one of said plurality of switching elements is turned ON in response to the magnitude of the output signal from said first means.

9. A program-controlled shutter as set forth in claim 7 wherein said integrator comprises
   a plurality of resistors connected to said switching elements, respectively, and
   a common capacitor connected in series to said plurality of resistors.

10. A program-controlled shutter as set forth in claim 7 wherein said closing pulse signal generating means comprises
    circuit means for transmitting therethrough said pulses from said pulse generator to said driving means when the output from said integrator reaches a predetermined level.

11. A program controlled shutter system comprising switch means, a plurality of shutter blades having aperture defining portions, driving means for opening and closing said shutter blades, a source of an analog signal having an amplitude level representative of the brightness of a subject, means converting said analog signal to a coded binary signal, a pulse generator, first means responsive to operation of said switch means for applying a number of pulses from said pulse generator to said driving means dependent upon said coded binary signal for stepwise opening said shutter blades, and second means operating independently of said first means for applying pulses from said pulse generator to said driving means after a determined time following operation of said switch means, dependent upon said coded binary signal, for stepwise closing said shutter blades.

12. The program controlled shutter system of claim 11 wherein said means converting said analog signal comprises decoder means having a plurality of output terminals for producing said coded binary signals at said output terminals wherein the level at one of the output terminals differs from the level of all other of said output terminals.

13. A program controlled shutter for a camera lens comprisng
 a. an exposure control mechanism comprising
  a plurality of shutter blades having aperture defining portions, and driving means for stepwise opening and closing said shutter blades in response to the application thereto of opening and closing pulse signals;
 b. photocell means for detecting the brightness of a subject;
 c. first converter means for converting the analog output signal from said photocell means into a digital signal;
 d. second converter means for converting the output from said first converter means into a binary coded decimal signal;
 e. third converter means connected to said second converter means and provided with a plurality of output terminals said third converter means comprising means for generating, in response to binary coded decimal signals from said second converter, an output signal which appears selectively at one output terminal of said plurality of output terminals, said third converter means providing said output signal continuously;
 f. opening pulse signal generating means for generating said opening pulse signal in response to said output signal from said third converter means and for applying said opeing pulse signal to said driving means, thereby opening said shutter blades so as to stop down the camera lens to a determined f-number depending upon the brightness of the subject;
 g. closing pulse signal generating means operating independently of said opening pulse signal generating means for generating said closing pulse signal in response to said output signal from said third converter means and for applying said closing pulse signal to said driving means, thereby closing said shutter blades after a determined exposure time depending upon the brightness of the subject;
 h. power supply means for supplying power to said exposure control mechanism, said opening and closing pulse signal generating means and to said first second and third converter means; whereby said exposure time depends upon the brightness of the subject.

14. A program-controlled shutter as set forth in claim 13 wherein said opening pulse signal generating means comprises
 a first bank consisting of a plurality of switches connected to said plurality of output terminals;
 a second bank consisting of a plurality of switching circuit means connected to the corresponding switches in said first bank, one of said switches in said first bank being turned on in response to the magnitude of said input signal from said third converter means, said one of said switches turning on one of the switching circuit means associated therewith in said second bank;
 voltage signal generating means for generating a first voltage signal when said switching circuit means in said second bank is turned on,
 a pulse generator for generating pulses with a predetermined pulse spacing, and
 means connected to said pulse generator and to said voltage signal generating means for generating said opening pulse signal in response to said first voltage signal and said pulses from said pulse generator.

15. A program-controlled shutter as set forth in claim 14, wherein said opening pulse signal generating means comprises
 a second voltage signal generator for generating a second voltage signal in response to said pulses from said pulse generator; and
 a circuit connected to said first voltage signal generating means and to said second voltage signal generator for generating a third voltage signal representative of the difference between said first and said second voltage signals and for converting said third voltage signal into said opening pulse signal.

16. A program-controlled shutter as set forth in claim 13 wherein said closing pulse generator means comprises first switching means connected to said third converter means and actuable in response to the output therefrom;
 an integrator connected to said first switching means and actuable when said switching means is turned on;
 a pulse generator for generating pulses with a predetermined pulse spacing; and means connected to said pulse generator and said integrator for generating said closing pulse signal in response to the output signal from said integrator and said pulses from said pulse generator.

17. A program-controlled shutter as set forth in claim 16 wherein said first switching means comprises
 a first bank consisting of a plurality of switches connected to said plurality of output terminals of said third converter means; and
 a second bank consisting of a plurality of switching circuit means connected to corresponding switches in said first bank, one of said switches in said first bank being turned on in response to the magnitude of said output signal from said third converter means for turning on said one of said switching circuit means associated therewith in said second bank.

18. A program-controlled shutter as set forth in claim 16 wherein said integrator comprises
 a plurality of resistors connected to said first switching means; and a common capacitor connected in series with said plurality of resistors.

19. a program-controlled shutter as set forth in claim 16 wherein said closing pulse signal generating means comprises circuit means for transmitting therethrough said pulses from said pulse generator to said driving means when the output from said integrator reaches a predetermined level.

* * * * *

UNITED STATES PATENT OFFICE
CERTIFICATE OF CORRECTION

Patent No. 4,016,574          Dated  April 5, 1977

Inventor(s)    Hiroshi Iwata, et al

It is certified that error appears in the above-identified patent and that said Letters Patent are hereby corrected as shown below:

In the Abstract, line 6: After "applied" insert --to--.

line 11: "the binary" should be --a binary--.

Column 4, lines 28 and 30: "comparator 27" should be --comparator 23--.

Column 4, line 51: "Q" (second occurrence) should be -- $\bar{Q}$ --.

Column 7, line 6: "16" should be --18--.

Column 7, in second column of Table 2: All the "6"'s should be --5--.

Column 8, line 20: Delete "is".

Column 8, line 39: Delete "is".

Column 9, line 14: "mechaism" should be --mechanism--.

UNITED STATES PATENT OFFICE
CERTIFICATE OF CORRECTION

Patent No. 4,016,574          Dated April 5, 1977

Inventor(s) Hiroshi Iwata, et al

It is certified that error appears in the above-identified patent and that said Letters Patent are hereby corrected as shown below:

Column 9, line 31: After "said" insert --closing pulse signal in response to said output signal from said --.

Column 10, line 13: "consiting" should be --consisting--.

Column 12, line 12: "input" should be --output--.

Signed and Sealed this

Eighth Day of November 1977

[SEAL]

Attest:

RUTH C. MASON
Attesting Officer

LUTRELLE F. PARKER
Acting Commissioner of Patents and Trademarks